United States Patent [19]

Langen

[11] 4,356,762
[45] Nov. 2, 1982

[54] MEAT CURING MACHINE

[76] Inventor: Christianus P. Langen, Zandkampen 11, Cuijk, Netherlands

[21] Appl. No.: 258,139

[22] Filed: Apr. 27, 1981

Related U.S. Application Data

[63] Continuation of Ser. No. 36,352, May 7, 1979, abandoned.

[51] Int. Cl.$^3$ .......................... B02B 3/12; B02B 23/00
[52] U.S. Cl. .......................................... 99/533; 99/535
[58] Field of Search .......................... 99/532, 533, 535; 69/30; 17/25, 51; 426/518, 519, 281, 302, 464, 473, 641, 642; 251/61.1

[56] References Cited

U.S. PATENT DOCUMENTS

| | | | |
|---|---|---|---|
| 2,656,785 | 10/1953 | Gannon et al. | 99/532 |
| 2,677,390 | 5/1954 | Davis et al. | 251/61.1 |
| 3,080,809 | 3/1963 | Harris et al. | 99/532 |
| 4,036,122 | 7/1977 | Langen | 99/533 |

*Primary Examiner*—Philip R. Coe
*Assistant Examiner*—Timothy F. Simone
*Attorney, Agent, or Firm*—Fetherstonhaugh & Co.

[57] ABSTRACT

This invention relates to a meat curing machine which is capable of performing the functions of pickle injection, massaging and tenderizing of meat. The machine has a curing chamber which has at least two compartments and an injection head is located in one of the compartments. The injection head supports a plurality of injection needles which are hollow and connected to a source of pressurized curing fluid. The housing is rotated to permit the meat to tumble onto the injection needles to be impaled thereon and the curing fluid is injected into the meat when the meat is impaled on the needles. The needles have an injection passage extending longitudinally thereof which opens outwardly at the distal end thereof, the distal end being angularly inclined with respect to the longitudinal extent of the needle.

8 Claims, 7 Drawing Figures

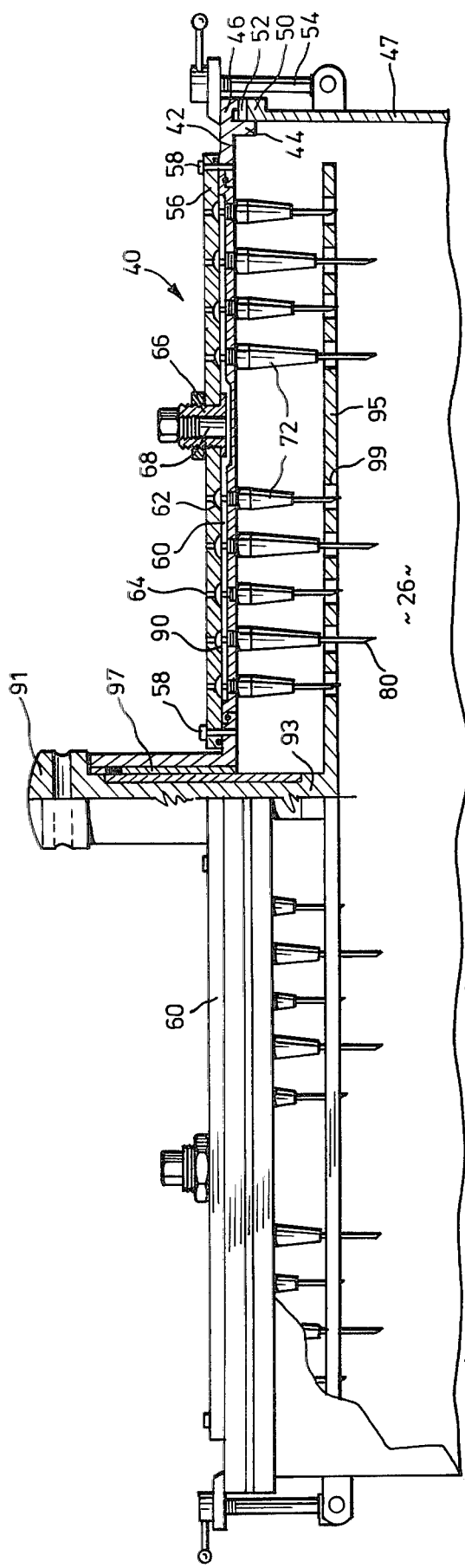

MEAT CURING MACHINE

This application is a continuation of application Ser. No. 036,352, filed May 7, 1979, abandoned.

FIELD OF INVENTION

This invention relates to meat curing machines. In particular, this invention relates to a meat curing machine in which the operations of pickle injection, massaging and tenderizing may be carried out. This machine is particularly suitable for use in the curing of meat such as pork, beef, lamb and poultry including hams, shoulders loins, bellies and the like.

PRIOR ART

In my prior U.S. Pat. No. 4,029,824, dated June 14, 1977, I have described a method and apparatus for curing meat in which the meat is tumbled so that it periodically falls under the influence of gravity onto a bed of needles, each of which is formed with a longitudinal slot in an outer face thereof, which permits fluids located in the curing chamber to move lengthwise along the needle into the meat.

It has now been discovered that the meat curing process can be made much more efficient by the direct injection of meat curing fluid in the form of pickle into the meat which is impaled on the needles during the tumbling operation. Contrary to general expectations in the trade, I have found that by the use of the machine of the present invention substantially the same amount of pickle is injected into and retained by each ham so that I am able to obtain a close Standard of Deviation. In the trade it was felt that it was necessary to use a preliminary pickle injection process in order to ensure that a predetermined quantity of pickle is injected into each ham so that the pickle content of the ham after curing will be within the permitted tolerances based on the weight of the ham. It was feared that because of the random nature in which the hams are tumbled in a meat curing machine of the type described in prior U.S. Pat. No. 4,029,824 and as described hereinafter, it would not be possible to maintain a close Standard of Deviation without employing the same prior pickle injection step. Tests which I have carried out with the machine of the present invention have shown that it is possible to obtain a close Standard of Deviation without the need to provide a preliminary pickle injection. Thus, by using the machine of the present invention it is possible to eliminate the requirement for a primary pickle injection machine.

When curing fluid is injected into a ham in a conventional pickle injector, a certain amount of pickle spills from the injection needles over the product and this pickle washes away valuable protein together with flavour. By reason of the fact that in the machine of the present invention the pickle is injected into the hams in an enclosed chamber in which the hams are subsequently tumbled, there is no loss of protein as such proteins can be reabsorbed during the tumbling and massaging of the hams in use. In addition, because the curing chamber is an enclosed chamber all of the pickle which is injected through the needles is retained therein and subsequently absorbed by the ham so that there is no loss of curing fluid.

The conventional injection needles which have been used for many years in pickle injectors have a closed end which is pointed. A brine injection passage extends inwardly from the other end of the needle to a point adjacent the closed end and a plurality of openings formed in the wall of the needle extend laterally from the centrally located brine injection passage. These needles have been used for a great many years and considerable difficulty has been experienced because of the tendency of the discharge passages in these needles to become clogged with meat. The discharge passage tends to fill with meat as the needle is inserted into the meat and the injection fluid is required to flush the meat from these passages in order to permit the pickle to be injected into the meat product. Because of problems resulting from clogging, the efficiency with which the needles inject pickle varies and it is necessary to effect a regular periodic servicing and checking of the product to ensure that the required amount of pickle is injected into the product with the required uniformity. It has, however, been a widely held belief that it was essential to use passages opening laterally from the injection needle in order to obtain the required brine distribution. Surprisingly, therefore, we have discovered that pickle can be injected through passages which open directly through the remote end of a needle without requiring supplementary laterally extending passages.

SUMMARY OF INVENTION

According to one aspect of the present invention, a meat curing machine comprises a housing mounted for rotation about a tumbling axis, said housing having a curing chamber formed therein, said curing chamber having first and second compartments having an inner end opening toward said tumbling axis and a closed outer end spaced outwardly from said tumbling axis whereby upon rotation of said tumbling axis meat located in one of said compartments will be tumbled into the other under the influence of gravity, vacuum passage means communicating with said compartments through which a vacuum is drawn in said compartments in use, an injection head at the outer end of said first compartment comprising a plurality of injection needles each having an injection passage opening longitudinally therethrough, said injection passage having an input end and a discharge end, said needles being mounted at the outer end of said first compartment with their discharge ends directed toward said inner end of said first compartment whereby meat tumbling from said second compartment into said first compartment in response to rotation of said chamber may fall onto and be impaled on said discharage ends of said injection needles, fluid passage means communicating between the input ends of said injection needles and a source of pressurized curing fluid whereby curing fluid may be transmitted under pressure from said source to said discharge ends of said needles to be injected into meat impaled thereon in use.

According to a further aspect of the present invention an injection needle for use in a pickle injector comprises an elongated body having a proximal end and a distal end, the proximal end adapted to be mounted in an injection head of a pickle injector, the distal end being angularly inclined across the width of the elongated body, an injection passage extending longitudinally of said elongated body, said injection passage opening into said elongated body at the proximal end thereof and opening out of said elongated body through the angularly inclined distal end.

The invention will be more clearly understood after reference to the following detailed specification read in conjunction with the drawings, wherein;

FIG. 2 is a sectional view through the injection head of the meat curing machine of FIG. 1 taken along the line 2—2 of FIG. 1;

FIG. 3 is an enlarged sectional side view of a needle mounted in the injection head;

FIG. 3a is a sectional side view of a needle constructed in accordance with a further embodiment of the invention;

Figure 1:
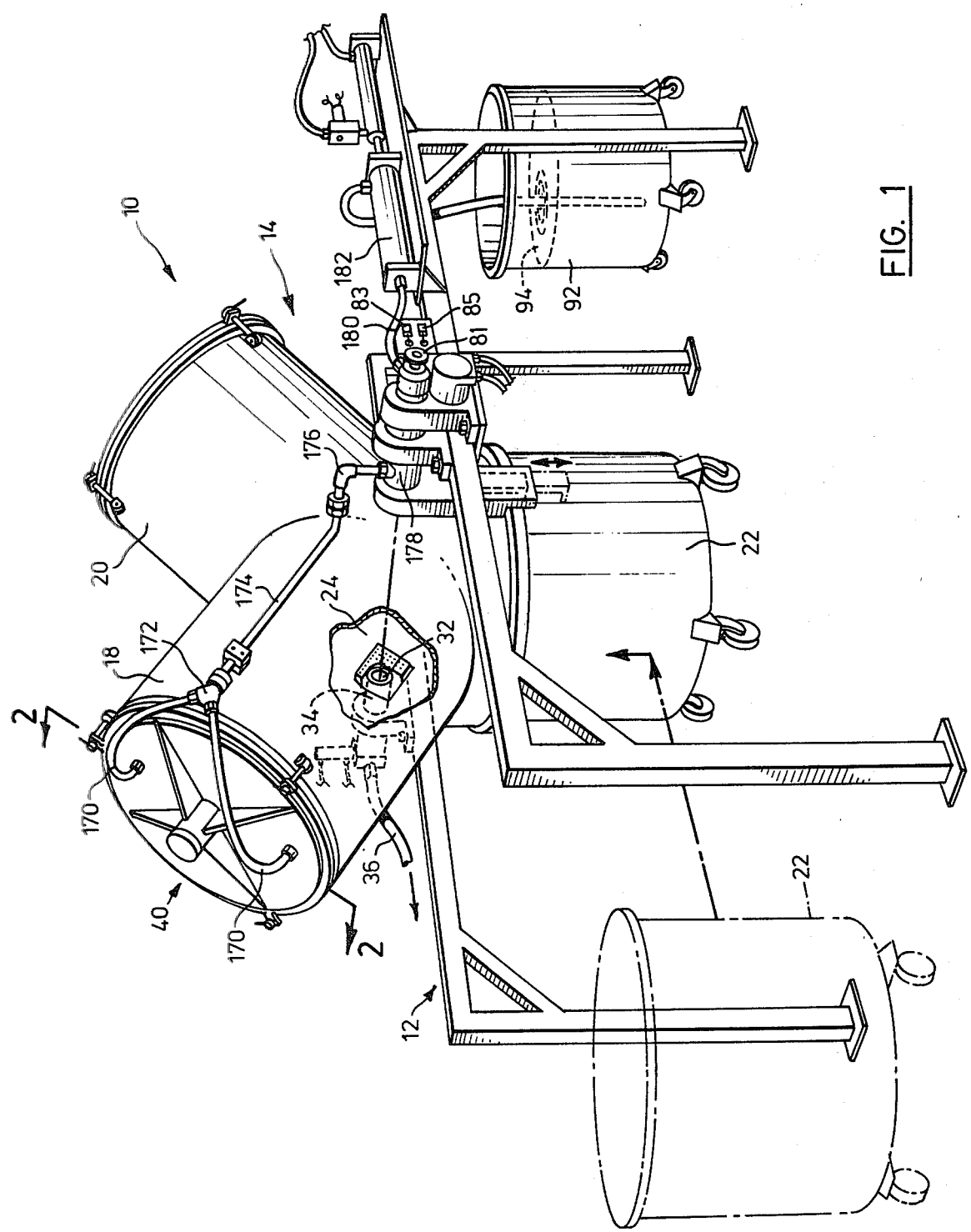
FIG. 1 is a pictorial view of a meat curing machine constructed in accordance with an embodiment of the present invention.
Figure 4:
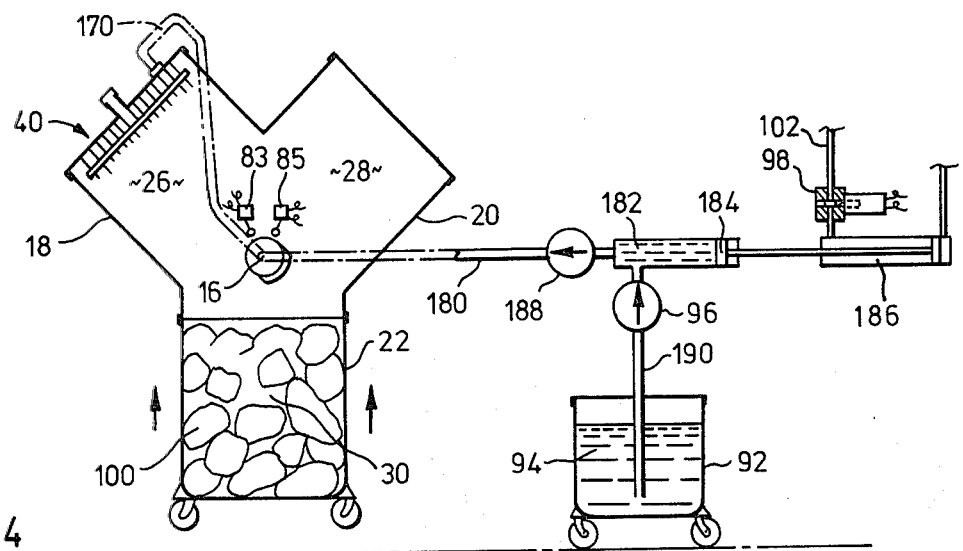
FIG. 4 is a diagrammatic side view showing a first step in the meat curing operation.
Figure 5:
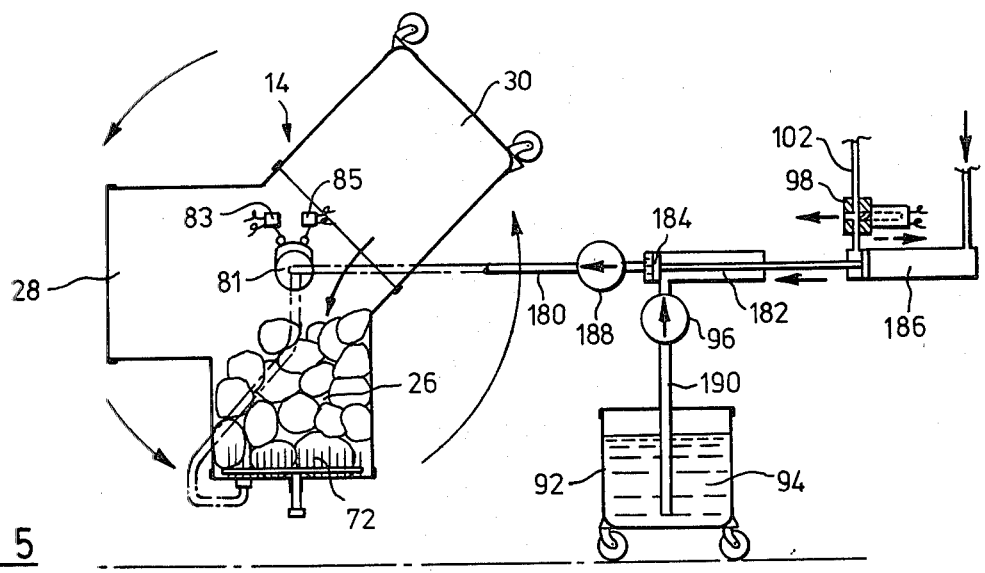
FIG. 5 is a view similar to FIG. 4 showing a second step in the meat curing operation.
Figure 6:
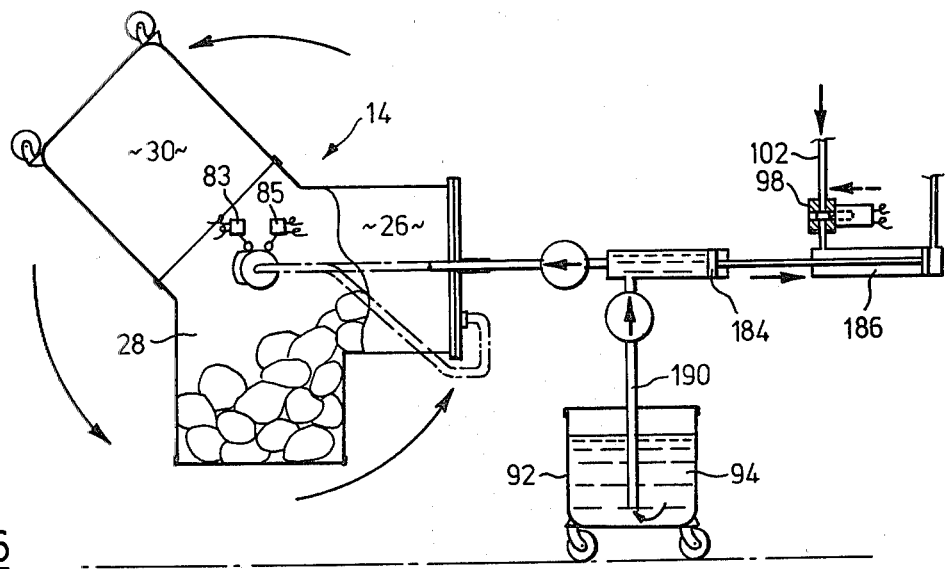
FIG. 6 is a view similar to FIG. 5 showing a third step in the meat curing operation.

With reference to the drawings, the reference numeral 10 refers generally to a meat curing machine constructed in accordance with an embodiment of the present invention. The meat curing machine comprises a frame 12 upon which a housing 14 is mounted for rotation about a tumbling axis 16. The housing 14 consists of first and second tank portions 18 and 20 and a detachable wagon portion 22. A tumbling chamber 24 is formed within the housing 14. As shown in FIGS. 4, 5 and 6 of the drawings, the tumbling chamber 24 is formed with a first compartment 26, a second compartment 28 and a third compartment 30 projecting radially outwardly from the tumbling axis 16. The inner ends of the compartments 26, 28 and 30 open toward the tumbling axis and the outer ends thereof are closed. A vacuum passage 32 opens into the tumbling chamber 24 through one of two support shafts 34 on which the housing 14 is mounted for rotation. The vacuum passage 32 is connected to a suitable vacuum source through a conduit 36.

An injection head, generally identified by the reference numeral 40, is located at the outer end of the first compartment 26. The injection head 40 (FIG. 2) includes an inner wall 42 which has an annular collar 44 adapted to fit in a close fitting relationship within the end of the tubular side wall 47 of the compartment 26. The end wall 42 also has a radially extending flange 46 arranged in a face-to-face relationship with the annular shoulder 50 located at the outer end of the tubular side wall 47. An annular sealing ring 52 is located between the flange 46 and the shoulder 50 and clamp members 54 are provided for releasably clamping the inner wall 42 with respect to the tubular wall 47. A pair of circular outer walls 56 are secured in an outwardly overlying relationship with respect to the inner wall 42 by bolts 58. A manifold chamber 60 is located between the outer wall 56 and the inner wall 42. The outer wall 56 has a plurality of circular concave shaped recesses 62 formed on the inner face thereof. A vent passage 64 opens outwardly from each recess 62. A coupling 66 is mounted in the outer wall 56 and has a through passage 68 opening outwardly from the manifold chamber 60. A conduit 170 is connected to the coupling 68.

A plurality of injection needles 72 are mounted on the inner wall 42 and project inwardly therefrom toward the inner end of the compartment 26. As shown in FIG. 3, the needles are of different lengths and each of the needles 72 includes a hollow needle 74 having a through passage 76. The through passage 76 has an input end 78 and an angularly inclined discharge end 80. As will be described hereinafter the use of a needle having an angularly inclined discharge end through which the passage 76 opens provides a surprising improvement in the injection process. A collar 82 is fixed to the needle 74 adjacent and spaced inwardly from the input end 78. A support sleeve 84 is arranged coaxially with a central body portion of the needle 74. The support sleeve 84 has a threaded end portion 86 adapted to be threadably inserted within threaded passages 88 in the inner wall 42. The input end 78 of the needles 74 project a substantial distance into the manifold chamber 60. A flexible diaphragm 90 has its outer periphery clamped between the inner wall 42 and the outer wall 56 and its inner periphery clamped between the outer wall 56 and the coupling 66. The flexible diaphragm 90 is drawn taut between its inner and outer periphery and, as shown in FIG. 3, the input ends 78 of the needles 74 extend into the manifold chamber 60 an extent sufficient to cause outward deflection of the diaphragm 90 into the concave recesses 62 of the outer wall 56. A stripper plate 95 is supported on a support post 93 which has a head 91 at the outer end thereof. The support post 93 is slidable in a bush 97 carried by the inner wall 42. The stripper plate 95 has stripper passages 99 aligned with the needles 72.

With reference to FIGS. 1, 4, 5 and 6 of the drawings, it will be seen that the conduits 170 which are in fluid communication with the manifold chamber 60 are connected through a Y-shaped coupler 172, to a further conduit 174 which is in turn connected through an elbow connection 176 to the support shaft 178 which is disposed opposite the support shaft 34 and also serves to support the housing 14 for rotation about the tumbling axis 16. The shaft 178 is hollow so that a fluid communication is provided with a further conduit 180 which is connected to an injection cylinder 182. A piston 184 (FIG. 4) is mounted in the injection cylinder 182 and is reciprocally driven by a pneumatic cylinder generally identified by the reference numeral 186. A one-way valve 188 is located in the line leading to the conduit 180. An intake conduit 190 extends between the injection cylinder 182 and a pickle storage vat 92 which stores a predetermined quantity of pickle or curing fluid 94. A one-way valve 96 is located in the conduit 190.

In use, a plurality of hams 100 are transported in the meat curing machine in the wheeled bucket 22 which is then coupled to the housing 14 as described in U.S. Pat. Nos. 3,746,314 and 4,029,824. A vacuum is then drawn in the tumbling chamber through the vacuum passage 32. The pneumatic cylinder 186 is activated to withdraw the piston 184 to the position shown in FIG. 4 of the drawings, thereby to draw a predetermined quantity of curing fluid into the injection chamber injection device 182.

The housing 14 is then rotatably driven to the position shown in FIG. 5, hereby causing the meat 100 to tumble out of the compartment 30 into the compartment 26 so that a lowermost layer is impaled on the needles 72. The hydraulic cylinder 186 is then activated to drive the piston 184 to the position shown in FIG. 5 of the drawings. The one-way valve 96 prevents the return of curing fluid to the source 94. The curing fluid is pumped through one-way valve 188 and the conduits which are connected to the injection head into the manifold chamber 60 (FIG. 3). As the pressure in the manifold chamber 60 increases toward the injection pressure, the diaphragm 90 is deflected outwardly away from the input end of the needle 74 into the valve recesses 62 to assume the position shown in broken lines at 90a in FIG. 3. The curing fluid then passes through the through passage 76 of the needle 74 to be discharged through the discharge end 80 into the meat impaled thereon. To ensure a rapid injection stroke of the piston 184, a vent valve 98 is provided in the conduit 102 leading from the pneumatic cylinder 186. The vent valve 98 permits an unrestricted movement of the piston of the pneumatic cylinder 186 toward the injection position.

The housing 14 is then further rotated to the position shown in FIG. 6 of the drawings. As the housing continues to rotate from the position shown in FIG. 6 to return to the position shown in FIG. 4, the head 91 of the support post 93 of the stripper plate 95 engages a control cam which moves the stripper plate outwardly to remove meat impaled on the needles 72. The housing 14 is rotated several times in order to repeat this cycle and may then be permitted to retain stationary in the position shown in FIG. 4 for a predetermined holding period and thereafter the injection cycle may be repeated several times until all of the predetermined quantity of curing fluid contained within the reservoir 94 is injected into the meat. A cam 81 is mounted for rotation on the shaft 178 and operates a pair of microswitches 83 and 85 which regulate the operation of the vent valve 98 and the pneumatic cylinder 186 respectively to control the timing of the operation of the injection step in relation to the angular position of the housing 14.

From the foregoing, it will be apparent that the apparatus of the present invention permits the so-called "pickle injection" to be carried out in a machine which is also capable of performing the vacuum massage, tenderizing and pickle injection in the same apparatus. As a result, it is possible to dispense entirely with the need for a separate machine for effecting the preliminary pickle injection. Tests have indicated that the machine of the present invention will provide a 2% increase in yield of product while staying within USDA Regulations. There is also a saving of from 30 to 50% in the amount of curing or pickle fluid because there are no losses due to spilling. The fact that the preliminary pickle injection step is no longer required reduces the amount of handling to which the product is subjected and this serves to minimize bacterial growth and the amount of trucking of the meat which is required within the processing plant.

As previously indicated not all of the needles 72 are of the same length. By providing needles which extend into the compartment 26 to a different length adjacent needles may penetrate meat falling thereon to a different level, thus improving the dispersal of curing fluid through the body of meat. This feature, although not essential is believed to be of considerable practical importance.

A further important feature of the needles 72 of the present invention is that the discharge end 80 is angularly inclined from one side to the other at an angle which is preferably about 60° to the longitudinal extent of the needle. By angularly inclining the end face of the needle and permitting the through passage 80 to open directly therefrom, it has been found that the needles do not tend to clog. In the conventional needle which has a centrally located point and injection passages opening laterally through the side walls of the needle, the injection passages tend to become clogged with pieces of meat which are driven into these passages as the needle is inserted and cannot be flushed out of these passages during the fluid injection process because of the tortuous path established between the side opening passages and the central injection passage. In contrast the straight through passage of the needles of the present invention permits any meat which is driven into the passage during insertion to be flushed from the passage by the pressure of the injection fluid. This serves to reduce the amount of down time required in order to maintain the efficient operation of the apparatus. It has also been found that the angularly inclined end 80 appears to simplify the withdrawal of the needle from the meat. The angularly inclined needle of the present invention can be withdrawn from meat products more easily than the conventional laterally opening needle and this again is believed to be related to the fact that the injection passage opens directly through the inclined discharge end 80.

In FIG. 3a of the drawing, an alternative needle construction is illustrated. In this construction the needle 74a is sharpened to provide a frusto-conical shaped end 80a which tapers toward the through passage 76a to provide a sharp edge 81a. Surprisingly, it has been found that a needle of this construction, tapering at an angle of 15° to the longitudinal axis and having a 4 mm external diameter and a 2 mm bore diameter, can be inserted into and withdrawn from meat products during the curing operation without significantly damaging the structure of the meat.

Various modifications of the apparatus of the present invention will be apparent to those skilled in the art. For example, an additional injection head may be provided in the chamber 28. Alternatively, an additional needle heat without the provision of an injection system may be provided in the chamber 28 for the purposes of increasing the tenderizing without increasing the amount of fluid injected into the meat. In this respect, however, it should be noted that care should be taken to avoid a situation where the meat is subjected to an excessive amount of tenderizing. In yet another modification, the housing may have the configuration illustrated in FIG. 1 of U.S. Pat. No. 4,029,824 in which it has only one chamber in addition to the chamber formed by the detachable meat transporting wagon 22.

What I claim as my invention is:

1. In a meat curing machine having a housing formed with a curing chamber located therein, said housing being mounted for rotation about a tumbling axis, said chamber having first and second compartments extending outwardly from the tumbling axis at circumferentially spaced intervals, said first and second compartments each having an inner end opening towards said tumbling axis and an outer end remote from said tumbling axis, means for drawing a vacuum in said curing chamber and means for rotating said housing about said tumbling axis so as to alternately raise and lower said first and second compartments relative to one another such that during a portion of the rotation the first compartment is located in a meat receiving position below the second compartment, the improvement comprising;

(a) a plurality of injection needles located at the outer end of the first compartment, each of said injection needles having an injection passage opening therethrough and each injection passage having an input end and a discharge end, the input ends communicating with a manifold located at the outer end of the first compartment with their discharge ends directed toward the inner end of the first compartment, (b) a source of curing fluid under pressure located externally of said housing, (c) fluid passage means communicating with the manifold at the input ends of the injection needles and connected to the source of pressurized curing fluid, and (d) control means in the fluid passage means and operative normally to stop the flow of fluid through said injection passage means but to permit the flow of fluid when said first compartment is in said meat receiving position with respect to said second compartment.

2. A meat curing machine as claimed in claim 1, wherein said control means is operative in response to rotation of said housing.

3. A meat curing machine as claimed in claim 2, further comprising means for controlling the volume of curing fluid flowing in response to operation of said control means to permit the flow of fluid through said injection passage.

4. A meat curing machine as claimed in claim 1, further comprising an inner wall across the outer end of said first compartment and a flexible diaphragm extending between the inner wall and the outer end of the first compartment in said chamber, said fluid passage means opening into the manifold between said inner wall and the outer end of the first compartment, said injection needles being mounted in said inner wall with their input ends opening into said manifold opposite said diaphragm and being normally closed by abutment against said diaphragm when said diaphragm is in the first position, said diaphragm being flexible to move to a second position for opening said input ends of said needles in response to a predetermined fluid pressure in said manifold.

5. A meat curing machine as claimed in claim 1 wherein the vacuum drawn within said curing chamber normally urges said diaphragm to said first position closing said input ends of said needles.

6. A meat curing machine as claimed in claim 1, wherein said injection needles each has a tubular body portion projecting inwardly of said first compartment, the tubular body portions of some of said needles being longer than the tubular body portions of other of said needles and adjacent injection needles are of different lengths whereby short and long needles are distributed evenly across the inner end wall.

7. An injection head for a machine for injecting meat curing fluid from a source under pressure into meat comprising, (a) a housing having spaced first and second walls forming a chamber therein, (b) a plurality of injection needles each having an injection passage opening therethrough, said injection passage having an input end and a discharge end, said injection needles being mounted in said housing with their input ends extending through said first wall and opening into said chamber and with their discharge ends projecting outwardly from the housing for insertion into a meat product, (c) a flexible diaphragm mounted in the housing and extending thereacross between said walls opposite the input ends of said needles in a spaced relationship with respect to said first wall to form a fluid receiving manifold compartment in said chamber, between said diaphragm and said first wall, said input ends of said plurality of needle injection passages each being disposed within said manifold compartment, said flexible diaphragm being movable between a normal first position abutting and closing the input passages of said needles and a second position in which the input passages are open to communicate with said manifold compartment, and (d) passage means opening from said source through the second wall of said chamber and said diaphragm into said manifold compartment, for admitting pressurized meat curing fluid thereto whereby said flexible diaphragm may be moved with respect to the input end of each needle between said normal closed position and said open position in response to fluid pressure within said manifold compartment.

8. An injection head as claimed in claim 7, wherein the walls of said chamber are disposed opposite one another in spaced first and second planes respectively, said diaphragm being mounted in a face-to-face relationship with said second wall and held taut so as to be normally urged to extend in said first plane, said diaphragm being spaced from said first wall to form said fluid receiving manifold between the diaphragm and the first wall, said needles being mounted in said first wall with their input ends projecting into said compartment, a plurality of valve recesses formed in said second wall and arranged one opposite each needle input end, said needle input ends projecting into said compartment to a sufficient extent to engage an overlying portion of said diaphragm and deflect it toward its associated valve recess, each of said overlying portions normally closing the input end of a needle, but being resiliently deflectable into its associated valve recess to open the input end of its associated needle for communication with said compartment in response to a fluid pressure in the manifold.

* * * * *